United States Patent
Hayashi

[11] 3,875,501
[45] Apr. 1, 1975

[54] PULSE WIDTH MODULATION TYPE RESISTANCE DEVIATION MEASURING APPARATUS

[75] Inventor: Eiji Hayashi, Tokyo, Japan

[73] Assignee: Yokogawa Electric Works, Ltd., Tokyo, Japan

[22] Filed: Nov. 13, 1973

[21] Appl. No.: 415,532

[30] Foreign Application Priority Data
Nov. 15, 1972 Japan.............................. 47-114397

[52] U.S. Cl. .............................. 324/62, 73/362 AR
[51] Int. Cl............................................. G01r 27/02
[58] Field of Search .................. 324/62; 73/362 AR

[56] References Cited
UNITED STATES PATENTS

| | | | |
|---|---|---|---|
| 3,725,644 | 4/1973 | Bailey........................ | 73/362 AR X |
| 3,754,442 | 8/1973 | Arnett............................ | 324/62 X |
| 3,786,350 | 1/1974 | Munt ............................ | 324/62 |

Primary Examiner—Stanley T. Krawczewicz
Attorney, Agent, or Firm—Parmelee, Johnson & Bollinger

[57] ABSTRACT

A resistance deviation measuring device, of the type used for measuring a temperature with a temperature-sensitive resistance and for obtaining a digital signal representing the measured temperature, is characterized by a simple and reliable arrangement operating without precision power sources but still with the characteristics of a pulse width modulating type analog-digital converter, i.e., with an integrator receiving as its input the sum of an unknown analog signal and either a positive or a negative reference signal, means for comparing the output of the integrator with a comparison signal, e.g., a sawtooth signal, and for selecting between the positive and negative reference signals as a result of the comparison to zero the average value of the input to the integrator, and with digital counting means for digitally measuring a time interval ended by the comparing means. The resistance deviation measuring device of the present invention connects the unknown temperature-sensitive resistance to a reference resistance in series, and uses a series voltage source to generate the same current flow through both resistances to produce an unknown voltage respectively. The unknown analog signal is formed by a circuit which applies the difference between the unknown voltage and reference voltage to the integrator input. The positive and negative reference signals are formed by a circuit inverting the reference voltage, and applying either the inverted or non-inverted reference voltages to the integrator input to be summed with the analog signal. The digital counting means measures the difference of the comparator pulse width from a half-cycle, and thus digitally represents the deviation of the unknown resistance from the reference resistance.

9 Claims, 3 Drawing Figures

PULSE WIDTH MODULATION TYPE RESISTANCE DEVIATION MEASURING APPARATUS

BACKGROUND OF THE INVENTION

1. Field of the Invention

This invention relates to a resistance deviation measuring device, and more particularly to a resistance deviation measuring device of a pulse width modulating type for producing a digital signal representing a resistively measured physical characteristic such as temperature.

2. Description of the Prior Art

In the measurement of a physical characteristic such as temperature, in order to obtain a digital signal representing the measured physical quantity, it is the usual practice first to obtain an analog electric signal varying with the temperature measured and then to convert the analog signal into a digital signal by means of an analog-to-digital converter. In know measuring devices, a separate circuit converts the temperature into an analog electric signal which is fed to a standard analog-to-digital converter. Where a temperature-measuring resistance such as a thermistor is used as a temperature detector, the circuit for converting the temperature into an analog electric signal generally consists of a bridge including the temperature-measuring resistance and an amplifier for amplification of an unbalance voltage of the bridge. As for the analog-to-digital converter, it is a generally accepted expedient to employ an integrating type analog-to-digital converter, such as pulse width modulating converter, which is almost free from noise influences. The necessity for employing these two different means in the measurement of temperatures has arisen from the fact that there has been no available device which is capable of directly converting a thermal signal in the form of a variable resistance into a digital signal.

SUMMARY OF THE INVENTION

It is a principal object of the present invention to provide an improved resistance deviation measurement device which is capable of converting directly into a digital signal a resistance variation which corresponds to a measured physical quantity. It is a further object of the present invention to provide a resistance deviation measurement device which employs a simple, economical and reliable construction free of precision power source requirements and which operates with the advantageous characteristics of a pulse width modulating converter.

In a preferred embodiment of the invention to be described hereinbelow in detail, the resistance deviation measuring device determines the deviation of an unknown resistance from a predetermined resistance value by means of pulse width modulating type converter means having integrating means receiving as its input the sum of an unknown analog signal and either a positive or negative reference signal, means for comparing the output of the integrating means with a comparison signal such as a sawtooth signal and for selecting between the positive and negative reference signals as a result of the comparison to zero the average value of the input to the integrating means, and having digital counting means digitally measuring a time interval determined by the comparing means. The resistance deviation measuring device is characterized by a reference resistance, and means such as a voltage source for generating the same current flow through both the unknown resistance and the reference resistance to produce thereacross an unknown voltage and a reference voltage respectively. Coupling circuit means connect the unknown voltage appearing across the unknown resistance to the integrating means to obtain the analog signal input thereto, preferably as the difference between the unknown and reference voltages. Further coupling circuit means connect the reference voltage appearing across the reference resistance with either inverted or noninverted polarity to the integrating means to obtain the positive and negative reference signal inputs thereto. The time interval measured by the digital counting means thereby represents the deviation of the unknown resistance from a predetermined resistance value. The described resistance deviation measuring device thus has a simplified construction capable of operating without a precision power source yet directly converting a resistance deviation into a digital signal.

In further aspects of the invention, the unknown resistance is in series with the reference resistance, their junction is at the ground level of the integrating means, and both are in series with a voltage source to generate the same current flow therethrough and to cause the device to integrate through a cycle of operation independently of the value of the voltage source, thereby promoting reliability and accuracy of the device.

These and other objects, aspects and advantages of the invention will be pointed out in, or apparent from, the detailed description hereinbelow, considered together with the following drawings.

DESCRIPTION OF THE PREFERRED EMBODIMENT

Figure 1:
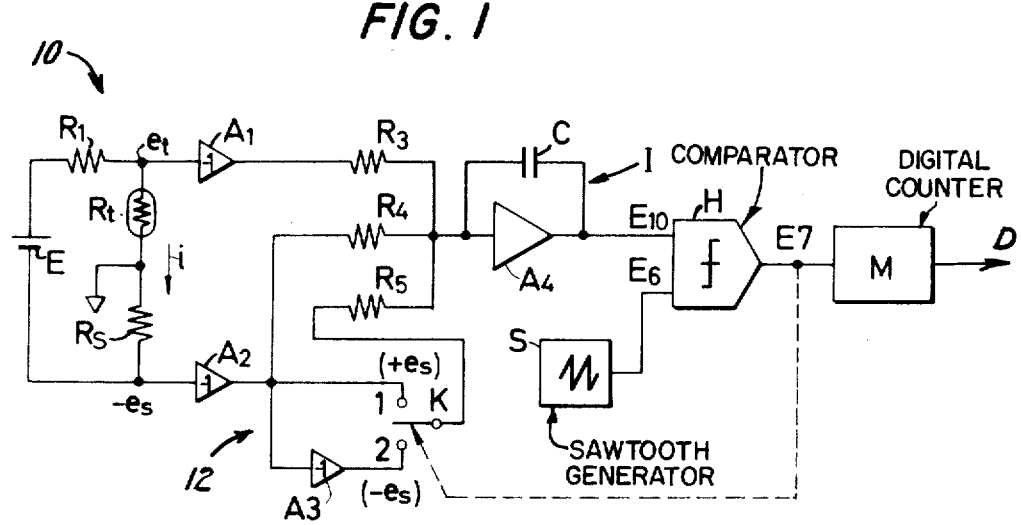
FIG. 1 is a diagram showing an embodiment of the present invention.

FIG. 1 illustrates a resistance deviation measurement device 10 constructed according to the invention and arranged to obtain a digital signal D representing the temperature measured by a temperature-sensitive resistance $Rt$, for example, a thermistor. As shown in FIG. 1, a DC voltage source E, a resistance $Rl$, the temperature-measuring resistance $Rt$, and a reference resistance $Rs$ are connected in series to cause a current $i$ to flow through $Rt$ and $Rs$. The junction of the temperature-measuring resistance $Rt$ and the reference resistance $Rs$ is grounded, and the current $i$ develops unknown voltage $e_t$ and reference voltage $-e_s$ at the other ends of the temperature-measuring resistance $Rt$ and reference resistance $Rs$, respectively.

The unknown voltage $e_t$ and reference voltage $-e_s$ are coupled respectively through buffer amplifiers A1 and A2, having a gain of $-1$ and functioning as inverters, and through equal resistances R3 and R4, to the input of an integrator I formed by an operational amplifier A4 and a feedback capacitor C. The integrator I therefore receives as an analog signal at its input the algebraic sum of the unknown voltage $e_t$ and reference voltage $-e_s$, or, in other words, the difference between the voltages developed across resistances $Rt$ and $Rs$.

The reference voltage $-e_s$ is also coupled to the input of integrator I through a path including buffer amplifier A2, a switching circuit 12, and a resistance R5 having a value smaller than the resistances R3 and R4. The switching circuit 12 has a changeover switch K, which may be an electronic switch, with fixed contacts 1 and 2, and a movable contact 3 connecting contacts 1 and 2 to resistance R5 under the control of a comparator H. Contact 1 is connected to buffer amplifier A2 through a noninverting branch, while contact 2 is connected to buffer amplifier A2 through an inverting branch including inverter amplifier A3 having a gain of $-1$. As shown in FIG. 1, voltages of $+e_s$ and $-e_s$ present at contacts 1 and 2 are connected by movable contact 3 through resistance R5 to the input of integrator I to form a positive and negative reference signal input thereto.

The integrator I therefore receives at its input the algebraic sum of the unknown voltage $e_t$ developed in the temperature-measuring resistance $Rt$ and the reference voltage $-e_s$ developed in the reference resistance $Rs$, together with either a positive reference voltage $+e_s$ or a negative reference voltage $-e_s$ which is selected by the switch K.

As shown in FIG. 1, the comparator H is connected to compare the output voltage E10 of the integrator I with a sawtooth voltage E6 of constant period and amplitude generated by a sawtooth generator S. The comparator H compares the output voltage E10 of the integrator I with the sawtooth voltage E6 and produces an output signal E7 which is 1 when the integrator output voltage E10 is greater than the sawtooth voltage E6 and 0 when E10 is less than E6. As shown in FIG. 1, the comparator output E7 is applied to the switch K, and to a digital counting circuit M which is arranged to measure the time interval or pulse width determined by output E7 and to produce a corresponding digital signal D. The comparator H is arranged to control the change over switch K in response to output signal E7. More particularly, when a 1 output signal from the comparator H is produced, switch K throws movable contact 3 to contact point 1, and when a 0 output signal is produced, switch K throws contact 3 to contact 2.

Figure 2A:
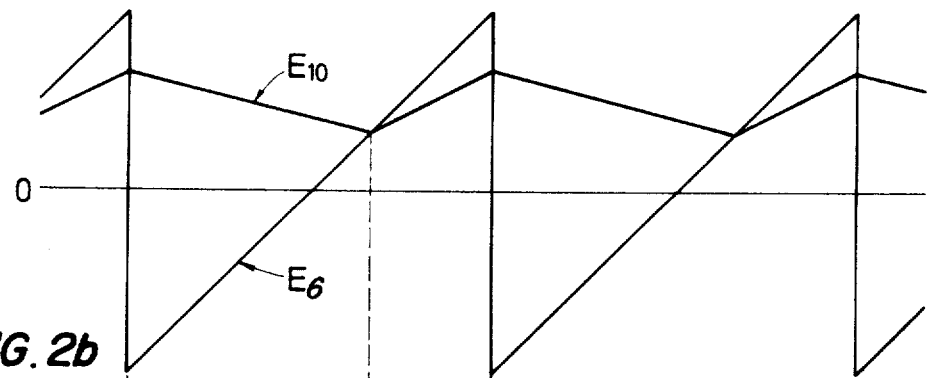
FIGS. 2a and 2b are graphs having a common horizontal time scale, illustrating the operation of the device shown in FIG. 1.
Figure 2B:
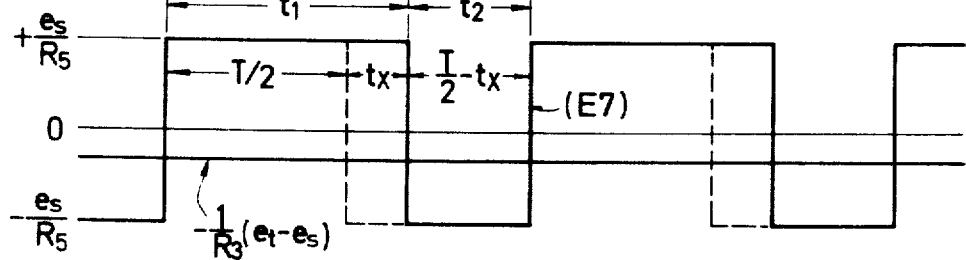

Operation of the measuring device 10 described above is easily understood with the aid of the graphs of FIGS. 2a and 2b, which show the device in steady state operation. Taking as an example the case in which the value of the temperature-measuring resistance $Rt$ is greater than the value of the reference resistance $Rs$, the algebraic sum of the voltages $e_t$ and $-e_s$ will be supplied to the input of integrator I as a negative analog input signal of $-(e_t - e_s)$ volts. Assuming a reference voltage of $+e_s$ volts is applied to the input of integrator I as a positive reference input signal, the resulting signal at the input of the integrator I will have a positive value because the value of the resistance R5 is smaller than the value of the resistances R3 and R4 respectively. Accordingly, the output voltage E10 of the integrator I will decrease as shown in the time interval $t1$ in FIG. 2a. During this interval, the sawtooth voltage E6 is varying from its maximum negative value towards its maximum positive value, but is smaller than the output voltage E10 of the integrator I. As a result, the output E7 of the comparator H is 1, which causes the switch K to apply the positive reference voltage $+e_s$ to integrator I, as assumed.

When the sawtooth voltage E6 becomes greater than the integrator output voltage E10, the output E7 of the comparator H is inverted into 0 and the switch K then connects the negative reference voltage $-e_s$ to the integrator I. the input to integrator I then is supplied with the negative voltages $-e_s$ and $-(e_t - e_s)$, with the result that the integrator output voltage E10 increases, as shown in the time interval $t2$ in FIG. 2a. It should be observed that the rate of variation of the integrator output E10 is greater in interval $t2$ than in interval $t1$, but the variation rate does not exceed the rate of variation of the sawtooth voltage E6. As soon as the sawtooth voltage E6 attains its maximum positive value, it is switched to its maximum negative value. The sawtooth voltage E6 again becomes smaller than the integrator output voltage level E10 and the output of the comparator H is changed to 1 to again connect the positive reference voltage $+e_s$ to integrator I.

The foregoing operation is repeated in each period T of the sawtooth voltage E6. The output E7 of the comparator H assumes the same waveform as the alternating voltage $\pm e_s$ (FIG. 2b). If the foregoing operation is repeated periodically, the average value of the input to the integrator I in one period T of the sawtooth voltage E6 becomes zero, as expressed in the following equation for the case in which R3 = R4.

$$\left[\frac{e_s}{R5} - \frac{(e_t - e_s)}{R3}\right] t_1 + \left[-\frac{e_s}{R5} - \frac{(e_t - e_s)}{R3}\right] t_2 = 0 \quad (1)$$

From equation (1) above, the following relation is obtained.

$$\frac{(e_t - e_s)}{e_s} = \frac{R3}{R5} \cdot \frac{t_1 - t_2}{t_1 + t_2} \quad (2)$$

Since
$e_t = Rti$ and
$e_s = Rsi$,
and letting $R3/R5 = k$ (constant)
and, if the sawtooth voltage E7 has a period T,
$t_1 = T/2 + t_r$
$t_2 = T/2 - t_r$
therefore equation (2) may be rewritten as $$\frac{Rt}{Rs} - 1 = k \frac{2t_r}{T} \quad (3)$$

Since $k$ and $T$ in equation (3) above are constant, it follows that if reference resistance $Rs$ is selected to be the value of the temperature-measuring resistance $Rt$ at a reference temperature (e.g., 0° C), then $t_r$ as given by equation (3) is proportional to the temperature to be measured. Thus, a digital signal D indicating the measured temperature value is obtained by digitally measuring the deviation of the pulse width $t_1$ of the comparator H from the half period time $T/2$ by means of the digital counting circuit M, e.g., by subtracting the count for interval $t_2$ from the count for interval $t_1$.

It will be appreciated from the foregoing description that in the device 10 constructed according to the present invention, a thermal resistance signal may be directly converted into a digital signal simply and in one step.

Particular major advantages of the measuring device 10 according to the instant invention are that the DC power sourse E is not required to be of high precision or stability, and satisfies its purpose if it is capable of maintaining stability for the short period of time corresponding to one cycle of operation of the integrator I. There is no need in the present invention for the provision of a high precision power source for the generation of a precise and stable reference voltage as is indispensably required in the existing analog-to-digital converters. In contrast to the difficulty of obtaining precision power sources, it is very easy to obtain a reference resistance Rs of high precision and stability, and the present invention therefore is more economical to provide.

Furthermore, by selecting the period T of the sawtooth voltage with a duration corresponding to an integral multiple of the period of estimated AC noise, it is possible to obtain a measurement which is not influenced by such AC noise. It will be clear from the foregoing description that the present invention provides a digital temperature measuring device which is accurate and reliable in operation and which can be fabricated at low cost.

As is clear from equation (3), the device of the invention is essentially a resistance deviation measuring device, so that, if the temperature-measuring resistance $R_t$ is replaced by an unknown resistance $R_x$, it is possible to measure a deviation of the unknown resistance $R_x$ from the reference resistance $R_s$.

Moreover, the invention can be applied to measurement of any physical quantity which can be manifested by variation in resitance.

Although a specific embodiment of the invention has been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

I claim:

1. A resistance deviation measuring device for determining the deviation of an unknown resistance from a predetermined resistance value by means of pulse width modulating type converter means having integrating means arranged to receive as inputs the sum of an unknown analog signal and either a positive or a negative reference signal, means for comparing the output of the integrating means with a comparison signal and for selecting between the positive and negative reference signals as a result of the comparison to zero the average value of the input signals to the integrating means, and having digital counting means digitally measuring a time interval determined by the comparing means, the resistance deviation measuring device being characterized by:

a reference resistance;
means for generating the same current flow through the unknown resistance and the reference resistance to develop thereacross an unknown voltage and a reference voltage respectively;
means for applying the unknown voltage developed across the unknown resistance to the input of the integrating means to obtain the unknown analog signal input thereto;
means for developing both of the positive and negative reference signal inputs to the integrating means from the reference voltage developed across the reference resistance; and
switch means responsive to the comparing means for applying said positive and negative reference signal inputs to the integrating means,
whereby the digital counting means digitally represents the deviation of the unknown resistance from a predetermined resistance value.

2. A resistance deviation measuring device as claimed in claim 1 wherein the means for applying the unknown voltage developed across the unknown resistance to the input of the integrating means comprises means for obtaining the difference between the unknown voltage and the reference voltage and for applying said difference to the input of the integrating means to form said analog signal.

3. A resistance deviation measuring device as claimed in claim 1 wherein the means for developing the positive and negative reference signal inputs to the integrating means comprises means for inverting the polarity of said reference voltage and wherein the switch means, controlled by said comparing means, selectively applies either the noninverted reference voltage or the inverted reference voltage to the input of the integrating means to form said positive and negative reference signals.

4. A resistance deviation measuring device as claimed in claim 1 wherein the time interval measured by the digital counting means is initiated a predetermined amount of time after the reference signal is changed by the comparing means which is equal to one half the period of one cycle of operation of the comparing means, whereby the digital counting means represents the deviation of the unknown resistance from the reference resistance.

5. A resistance deviation measuring device as claimed in claim 4 wherein the unknown resistance is a temperature-sensing resistance, and wherein the reference resistance is provided with a predetermined resistance value representing a predetermined temperature value.

6. A resistance deviation measuring device as claimed in claim 1 wherein said reference resistance and said unknown resistance are connected in series with each other, and wherein the means for generating the same current flow through the unknown resistance and reference resistance comprises a voltage source.

7. A resistance deviation measuring device as claimed in claim 6 wherein the junction of the unknown resistance and reference resistance is connected to the ground level of the integrating means, and wherein the means for applying the unknown voltage across the resistance to the input of the integrating means comprises a first coupling circuit connected to the unknown resistance opposite said ground connection and connected to the input of the integrating means and a second coupling circuit connected to the reference resistance opposite said ground connection and to the input of the integrating means, said two coupling circuits forming the analog input voltage applied to the integrating means as the difference between said unknown voltage and said reference voltage.

8. A resistance deviation measuring device as claimed in claim 7 wherein said first and second coupling circuits each comprise inverting means in series with resistance means.

9. A resistance deviation measuring device as claimed in claim 6 wherein the junction of the unknown resistance and reference resistance is connected to the ground level of the integrating means, and wherein the means developing the positive and negative reference signal inputs to the integrating means comprises a coupling circuit connected to the reference resistance opposite said ground connection and connected to the input of the integrating means, said coupling circuit comprising a resistance in series with the integrating means and having means for inverting the polarity of the reference voltage, said switch means selecting between the two polarities of reference voltage and applying them to the input of the integrating means.

* * * * *